A. J. CZARNIECKI.
MECHANICAL BRAKE.
APPLICATION FILED FEB. 17, 1920.

1,366,523.

Patented Jan. 25, 1921.
2 SHEETS—SHEET 1.

INVENTOR
A. J. Czarniecki
BY
ATTORNEY

A. J. CZARNIECKI.
MECHANICAL BRAKE.
APPLICATION FILED FEB. 17, 1920.

1,366,523.

Patented Jan. 25, 1921.
2 SHEETS—SHEET 2.

INVENTOR
A.J. Czarniecki
BY
Maurice Palmer
ATTORNEY

UNITED STATES PATENT OFFICE.

ANDREW J. CZARNIECKI, OF PLYMOUTH, PENNSYLVANIA.

MECHANICAL BRAKE.

1,366,523.	Specification of Letters Patent.	Patented Jan. 25, 1921.

Application filed February 17, 1920. Serial No. 359,398.

*To all whom it may concern:*

Be it known that I, ANDREW J. CZARNIECKI, citizen of Poland, and resident of Plymouth, in the county of Luzerne and State of Pennsylvania, have invented certain new and useful Improvements in Mechanical Brakes, of which the following is a specification.

This invention relates to mechanical brakes, and has for its main object the provision of such a device which will be simple in operation and efficient in mechanical advantage.

The above and other objects will become apparent in the description below, in which characters of reference refer to like-named parts in the drawings.

Referring briefly to the drawings, Figure 1 is a plan view of my device attached to a motor to illustrate the manner of its use.

Figure 1:
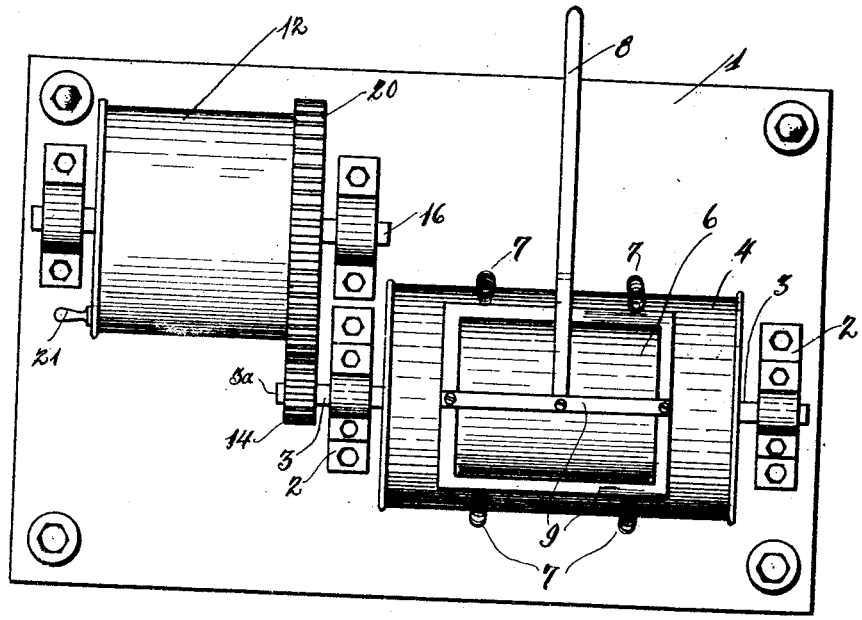
Figure 2:
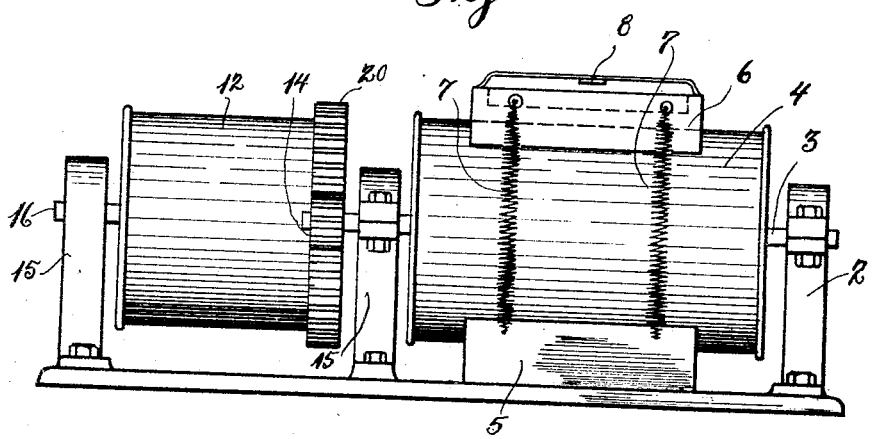
Fig. 2 is a front elevational view of the same.
Figure 3:
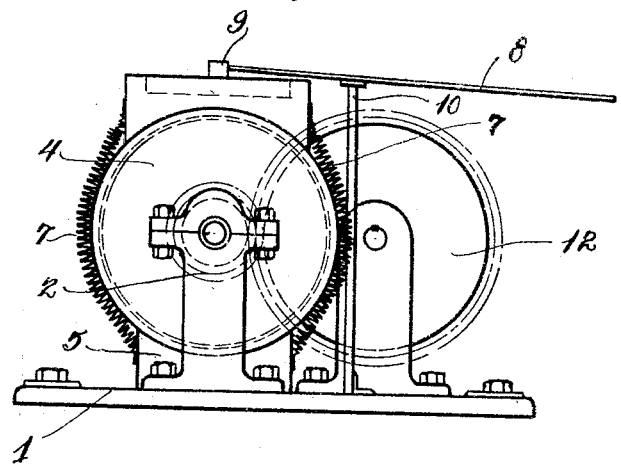
Fig. 3 is a side elevational view of the same.

Referring now in detail to the drawings, the numeral 1 represents the base upon which my device is mounted, and 2 represents a pair of bearings mounted upon pedestals which are supported on said base. A shaft 3 is rotatably mounted in said bearings, and a hollow drum 4 is concentrically rigid to said shaft. Said shaft is extended beyond its bearing at 3ª, and a pinion or small gear 14 is rigid to the extended end thus provided. This pinion is in mesh with a gear 20 which is part of a motor 12 later to be described. This motor is shown simply to illustrate the operation of my brake, as the latter is useful with any type of driving power.

A post 10 is mounted on the base 1 as shown, and a lever 8 is pivotally mounted to the top of said post. The short end of said lever is attached to a frame 9, and a brake shoe 6 is secured to the underside of said frame. Said brake shoe is curved to conform to the curvature of the drum 4, and the curved side thereof is adapted to contact with said drum. Diametrically opposite to said shoe 6, and normally resting on the base 1, is a similar brake shoe 5. Helical springs 7 are attached to said shoes 6 and 5, so as to resiliently unite said shoes. Now, in operation, as the drum 4 is being rotated by the gear 20, and it is desired to stop the motion of the same, or to retard the same, the lever 8 is lifted so as to force the shoe 6 lightly down upon said drum. If, however, it is desired simply to diminish the speed of said drum, and to regulate the speed at a constant, or approximately constant value, the lever 8 is forced downward, thus lifting the shoe 6 from contact with the drum 4 and raising the shoe 5 into contact with said drum; thus, by means of the helical springs 7, the pressure upon said drum may be delicately regulated so as to retard the speed of said drum to any desired degree.

Figure 5:
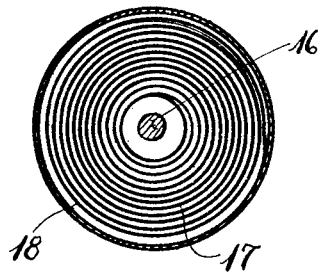
Fig. 5 is a cross-sectional view taken substantially on the line A—A of Fig. 4.
Figure 4:
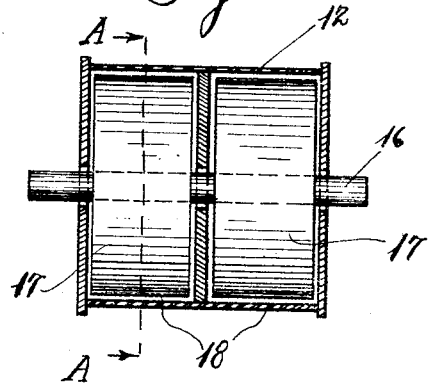
Fig. 4 is an elevational view of the spring motor partly in section to expose the interior thereof.

In Figs. 4 and 5 I have illustrated in detail a type of spring motor which may be used to demonstrate the operation of my brake. The same comprises a drum 12 rotatably mounted upon a shaft 16 rigidly supported in bearings as shown. Said drum 12 is hollow and contains two compartments 18, in each of which a coiled band spring 17 is contained. The central end of each spring 18 is attached to the shaft 16, while the peripheral end is attached to the inside of the shell of the drum, so that, when the drum is rotated, the springs are wound up and receive energy which they will later expend in rotating the drum 12. A handle 21 is applied to the side of the drum 12 for turning the same.

I claim:

1. A device of the class described comprising a base, pedestals mounted on said base, bearings in said pedestals, a shaft rotatably mounted in said bearings, a drum rigidly and concentrically mounted upon said shaft, a support, a lever pivotally mounted on said support, a brake shoe adapted to contact with said drum, a second brake shoe mounted diametrically opposite said first-named brake shoe and adapted to contact with said drum, said second-named brake shoe attached to said lever and adapted to be moved thereby, and resilient means connecting said brake shoes.

2. A device of the class described comprising a base, pedestals mounted on said base, bearings in said pedestals, a shaft rotatably mounted in said bearings, a drum rigidly and concentrically mounted upon said shaft, a support, a lever pivotally mounted on said support, a brake shoe adapted to contact with said drum, a second brake shoe mounted diametrically opposite to said first-named brake shoe and adapted to contact with said drum, said second-named brake shoe attached to said lever and adapted to be moved thereby, springs attached to said brake shoes to connect the same, said springs passing along the periphery of said drum.

Signed at Plymouth in the county of Luzerne and State of Penna., this 12 day of Feb., A. D. 1920.

ANDREW J. CZARNIECKI.